United States Patent Office 3,804,782
Patented Apr. 16, 1974

3,804,782
FLEXIBLE CELLULAR POLYURETHANE FOAM COMPOSITIONS HAVING INCREASED FLAME RETARDANCE
John G. Demou, Lincoln Park, Louis C. Pizzini, Trenton, and John T. Patton, Jr., Wyandotte, Mich., assignors to BASF Wyandotte Corporation, Wyandotte, Mich.
No Drawing. Filed June 19, 1972, Ser. No. 264,157
Int. Cl. C08g 22/46; C08j 1/22
U.S. Cl. 260—2.5 AW        9 Claims

ABSTRACT OF THE DISCLOSURE

Flexible cellular foam compositions are prepared by reacting an organic compound having at least two active hydrogen atoms with an organic polyisocyanate employing an isocyanate index of 115–225 in the presence of a catalytically sufficient amount of a 1,3,5-tris(N,N-dialkylaminoalkyl) - 5-hexahydratriazine or the alkylene oxide and water adducts thereof. The resulting foam compositions exhibit excellent flame retardant properties.

BACKGROUND OF THE INVENTION

(1) Field of the invention

The present invention pertains to flexible cellular foam compositions and in particular to flexible polyurethane-based cellular foam compositions and methods for the preparation therefor. More particularly, the present invention relates to the preparation of flexible polyurethane-based cellular foam compositions using catalytically sufficient amounts of an isocyanate trimerization catalyst.

(2) Prior art

The preparation of high resiliency flexible polyurethane-based foam compositions generally entails the reaction of either a polyether or polyester polyol, water, a cross-linking agent, amine catalyst, surfactant and organic polyisocyanate, followed thereafter by the curing of the foam product. In preparing these foams it is essential that stoichiometric ratios be closely controlled, i.e. that at most only slightly excess amounts over the stoichiometric requirements of organic polyisocyanate be employed. In other words an icocyanate index of from about 100 to 115 must be employed in preparing these high resiliency flexible foams.

Moreover, in preparing high resiliency flexible foams polymeric isocyanates, as well as additional agents, are required to impart flame retardant properties to the resulting product. Thus, in preparing these foams it is imperative to control the amounts of reactants as well as selectively choosing the ingredients, thereby diminishing the advantages accruing to these foams. It is the alleviation of these problems to which the present invention is directed.

SUMMARY OF THE INVENTION

The present invention generally provides high resiliency flexible polyurethane-based foam compositions which are prepared by the reaction of an organic compound having at least two active hydrogen atoms with an organic polyisocyanate employing a high isocyanate index in the presence of a catalytically sufficient amount of an isocyanate trimerization catalyst. By employing these catalysts in the urethane reaction, isocyanate indices of up to about 200 can be used in preparing the foams. By virtue of the high isocyanate index which can be employed, the need for other agents in order to impart flame retardancy to the resulting product is eliminated.

For a more complete understanding of the present invention, reference is made to the following detailed description and examples thereof.

DESCRIPTION OF THE PREFERRED EMBODIMENTS

It has unexpectedly been found that when certain isocyanate trimerization catalysts are employed in the preparation of flexible polyurethane foam products high isocyanate indices can be utilized. Moreover, it has been found that the incorporation and use of these catalysts obviates the need for polymeric isocyanates, flame retardants and the like for imparting high resiliency and good flame characteristics to these flexible foams. Additionally, it has been found that as a result of the use of high isocyanate indices the need for conventional amine cross-linking agents is eliminated. All of these advantages are directly attributable to the use of the catalysts defined herein. The preferred isocyanate trimerization catalysts employed in the practice of the present invention are 1,3,5-tris(N,N - dialkylaminoalkyl)-s-hexahydrotriazines or the alkylene oxide and water adducts thereof.

1,3,5 - tris(N,N - dialkylaminoalkyl)-s-hexahydrotriazines are generally prepared by reacting equimolar amounts of a dialkylaminoalkylamine and a 37 percent aqueous solution of formaldehyde (formalin) at a temperature ranging from about ° C. to 20° C., and at atmospheric pressure. More particularly, the amine and the formaldehyde are mixed together with gentle stirring at about 0° C. Thereafter, and with continuous gentle stirring the resulting mixture is allowed to heat up to room temperature. The hexahydrotriazine compound is then recovered by first salting out the hexahydrotriazine from the reaction mixture with a strong base, such as, potassium hydroxide, and then purifying by distillation. These hexahydrotriazine compounds and their methods of preparation are more particularly described by Nicholas et al., Journal of Cellular Plastics, 1 (1), 85 (1965), and Graymore, Journal of the Chemical Society, 1493 (1931).

Representative of the 1,3,5 - tris(N,N - dialkylaminoalkyl)-s-hexahydrotriazines useful herein include, for example, 1,3,5-tris(N,N-dimethyl-2-aminoethyl) - s - hexahydrotriazine, 1,3,5 - tris(N,N-dimethyl-2-aminopropyl)-s-hexahydrotriazine, and the like; 1,3,5-tris(N,N-diethyl-2-aminoethyl) - s - hexahydrotriazine; 1,3,5-tris(N,N-diethyl - 3 - aminopropyl)-s-hexahydrotriazine, and the like; 1,3,5 - tris(N,N-dipropyl - 2 - aminoethyl)-s-hexahydrotriazine and the like; and so forth. The preferred compound is 1,3,5-tris(N,N-dimethyl - 3 - aminopropyl)-s-hexahydrotriazine which can also be designated as 1,3,5-tris(3-dimethylaminopropyl)-s-hexahydrotriazine.

Other preferred isocyanate trimerization catalysts, as noted, are the alkylene oxide and water adducts of the hereinbefore described 1,3,5 - tris(N,N - dialkylaminoalkyl) - s - hexahydrotriazines. These compounds are, presumably, quaternary ammonium hydroxides having the following postulated structure:

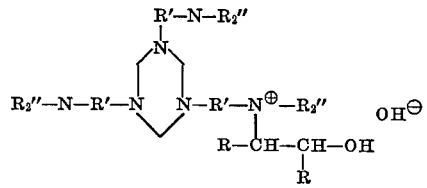

wherein each R, individually, is hydrogen or lower alkyl, such as, methyl, ethyl, propyl, isopropyl, butyl, t-butyl, isobutyl, and pentyl; R″ is lower alkyl, such as those enumerated for R, and R′ is alkylene, such as, ethylene, propylene, and butylene as derived from the useful hexahydrotriazines, with again, the preferred hexahydrotriazine being the same as the one defined above.

In regard to the postulated structure it is apparent that there are six tertiary nitrogen sites which could serve as the point of formation for the quaternary ammonium hydroxide and, therefore, the above-depicted structure is only illustrative. It is further noted that the hydroxyl group may be either primary or secondary.

The alkylene oxides which may be used to prepare the adducts are, preferably, linear alkylene oxides, such as, ethylene oxide, propylene oxide, the butylene oxides, and the pentylene oxides. Although not preferred, alicyclic oxides, such as cyclopentylene oxide, cyclohexylene oxide, and the like, can be used herein. Also substituted alkylene oxides, such as styrene oxide, can be used herein. The preferred alkylene oxide, though is propylene oxide.

When 1,3,5-tris(3-dimethylaminopropyl) - s - hexahydrotriazine, propylene oxide and water are used to prepare the preferred adduct, the resultant is presumably:

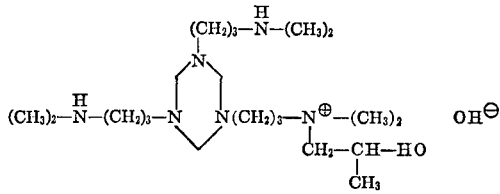

These alkylene oxide and water adducts are generally prepared by reacting substantially equimolar amounts of hexahydrotriazine, alkylene oxide and water, at a temperature ranging from about 10° C. to 80° C. for a period of time ranging from about five minutes to two hours and at a pressure ranging from about atmospheric pressure to fifty p.s.i.g. Any conventional reaction mode can be employed such as:

(1) Reacting the hexahydrotriazine and alkylene oxide, at atmospheric or elevated pressure, for a period of from about fifteen to sixty minutes, preferably, fifteen to thirty minutes, and at a temperature of from about 10° C. to 35° C., preferably, 20° C. to 30° C., and, then, adding and reacting therewith the water at a temperature of from about 25° C. to 80° C., preferably, 40° C. to 60° C., for a period of from about ten to sixty minutes, preferably, from about fifteen to forty minutes;

(2) Adding water to the hexahydrotriazine followed thereafter by the alkylene oxide addition, this mode of reaction being carried out under the same reaction conditions defined above; or (3) Concurrently, but separately, adding to and reacting the alkylene oxide and water with the hexahydrotriazine at a temperature of from about 10° C. to 80° C., preferably, 20° C. to 60° C., for a period of from about five to sixty minutes, preferably, fifteen to forty minutes.

The resulting products are highly viscous products which can be employed as solutions thereof to facilitate handling. For a more comprehensive discussion of these adducts reference is made to copending U.S. patent application Ser. No. 207,567, filed Dec. 13, 1971.

Other isocyanate trimerization catalysts which can be used herein include 2,4,6-tris(dimethylaminomethyl) phenol, o-, p- or a mixture of o- and p-(dimethylaminomethyl)phenol, calcium naphthenate, and organotin compounds, such as those disclosed in U.S. Pat. No. 3,396,167, the disclosure of which is incorporated by reference, and in particular triorganotin alkoxides and bis(triorganotin) oxides. Also useful are those catalysts described in Saunders and Frisch, Polyurethanes, Interscience Publishers, 1962, p. 94.

In preparing a foam product in the presence of these catalysts, generally, from about 0.05 part to 10 parts by weight of catalyst per 100 parts by weight of the polyol is employed. Preferably, from about 0.1 part to 5 parts by weight of catalyst per 100 parts of polyol is employed.

The polyurethane-based foam products which are prepared in accordance herewith generally comprise the reaction product of an organic compound having at least two active hydrogen atoms, such as, a hydroxy-terminated polyester, polyesteramine, amide or polyether, and an organic polyisocyanate.

In general, any organic compound containing at least two active hydrogen atoms may be employed herein for reaction with the polyisocyanate to produce a high resiliency flexible polyurethane foam. Examples of suitable types of organic compounds containing at least two active hydrogens groups are castor oil, hydroxy-containing polyesters, polyalkylene polyether polyols, hydroxy-terminated polyurethane polymers, polyhydric polythioethers, alkylene oxide adducts of acids of phosphorus, polyacetals, aliphatic polyols, as well as mixtures thereof.

Any suitable hydroxyl-containing polyester may be used such as are obtained, for example, from polycarboxylic acids and polyhydric alcohols. Any suitable polycarboxylic acid may be used, such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexanedicarboxylic acid. Any suitable polyhydric alcohol including both aliphatic and aromatic may be used, such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol, such as 2,2-(4,4'-hydroxyphenyl) propane, commonly known as Bisphenol A.

Any suitable polyalkylene polyether polyol may be used, such as the polymerization product of an alkylene oxide or of a mixture of alkylene oxides with a polyhydric alcohol. Any suitable polyhydric alcohol may be used, such as those disclosed above for use in the preparation of the hydroxyl-containing polyesters. Any suitable alkylene oxide may be used, such as ethylene oxide, propylene oxide, butylene oxide, amylene oxide, and heteric or block copolymers of these oxides. The polyalkylene polyether polyols may be prepared from other starting materials, such as tetrahydrofuran and alkylene oxide-tetrahydrofuran copolymers; epihalohydrins, such as epicholorohydrin; as well as aralkylene oxides, such as styrene oxide. The polyalkylene polyether polyols may have either primary or secondary hydroxyl groups and, preferably, are polyethers prepared from alkylene oxides having from 2 to 6 carbon atoms, such as polyethylene ether glycols, polypropylene ether glycols and polybutylene ether glycols. The polyalkylene polyether polyols may be prepared by any known process, such as, for example, the process disclosed by Wurtz in 1859 in Encyclopedia of Chemical Technology, vol. 7, pp. 257–262, published by Interscience Publishers, Inc. (1951) or in U.S. Pat. No. 1,922,-459.

Typical polyether polyols include polyoxyethylene glycols, poly-1,2-oxybutylene and polyoxyethylene glycols polytetramethylene glycol, block copolymers, e.g., combinations of polyoxypropylene and polyoxyethylene glycols, poly-1,2-oxybutylene and polyoxyethylene glycols and poly-1,4-oxybutylene and polyoxyethylene glycols, and random copolymer glycols prepared from blends or sequential addition of two or more alkylene oxides. Also, adducts of the above with trimethylolpropane, glycerine and hexanetriol as well as the polyoxypropylene adducts of higher polyols, such as pentaerythritol and sorbitol, may be employed. The polyether polyols generally have an average equivalent weight from about 150 to 5000 and preferably have an average equivalent weight from about 200 to 2000. Polyoxypropylene glycols having molecular weights from about 400 to 2500 corresponding to equivalent weights from about 200 to 1250 and mixtures thereof are particularly useful as polyol reactants. Also, polyol blends such as a mixture of high molecular weight polyether polyols with lower molecular weight polyether polyols or monomeric polyols can be used in preparing the polyurethane.

Any suitable polyhydric polythioether may be used, such as, for example, the condensation product of thiodiglycol or the reaction product of a dihydric alcohol, such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol, such as ethanolamine, with the polycarboxylic acids set forth above or they may be made using the same components that make up the hydroxyl-containing polyester with only a portion of the components being a diamine, such as ethylene diamine.

Alkylene oxide adducts of acids of phosphorus which may be used include those neutral adducts prepared from the alkylene oxides disclosed above for use in the preparation of polyalkylene polyether polyols.

The organic polyisocyanates which are advantageously employed in the present invention can be represented by the formula:

$$R(NCO)_z$$

wherein R is a polyvalent organic radical selected from the group of aliphatic, aromatic, arylalkyl and alkylaryl organic radicals as well as mixtures thereof; and z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as tris-(4-isocyanatophenyl)-methane, 2,4,6-toluene triisocyanates; the aromatic tetraisocyanates, such as 4,4'-dimethyldiphenylmethane-2,2',5',5'-tetraisocyanate, and the like; alkylaryl polyisocyanates, such as xylylene diisocyanate; aliphatic polyisocyanates, such as hexamethylene-1,6-diisocyanate, lysine diisocyanate methylester and the like, and mixtures thereof. Other organic polyisocyanates include polymethylene polyphenylisocyanate, hydrogenated methylene diphenylisocyanate, m-phenyene diisocyanate, naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated by the present invention are the so-called "quasi-prepolymers." These quasi-prepolymers are prepared by reacting an excess of organic polyisocyanate or mixtures thereof with a minor amount of an active hydrogen containing compound as determined by the well-known Zerewitinoff test, as described by Kohler in J. Am. Chem. Soc., 49, 3181 (1927). These compounds and their method of preparation are well known in the art. The use of any one specific active hydrogen compound is not critical hereto, rather, any such compound that can be used to prepare a quasi-prepolymer can be employed herein. Generally speaking, the quasi-prepolymers are prepared by reacting an organic polyisocyanate with less than a stoichiometric amount, based on the weight of the polyisocyanate of the active hydrogen-containing compound. Suitable active hydrogen-containing groups are those hereinbefore described.

In the practice of the present invention it is preferred to use as the isocyanate either crude toluene diisocyanate, an 80:20 weight mixture of 2,4- and 2,6-toluene diisocyanate, polymethylene polyphenyl polyisocyanate, crude methylene di(phenylisocyanate) or mixtures thereof.

In accordance with the present invention, a polyisocyanate is employed at an isocyanate index of from about 115 to 225, preferably, from about 130 to 190. As used herein, the term isocyanate index means the actual amount of isocyanate used divided by the theoretically required stoichiometric amount of isocyanate multiplied by one hundred. See Bender, Handbook of Foamed Plastics, Lake Publishing Corp., Libertyville, Ill. (1965). Another outstanding advantage of the present invention is that when operating at these high indices no other catalyst need be employed. In other words, conventional catalysts, such as tertiary amines and the like, need not be incorporated into the foam formulation in order to provide the products envisioned hereby. This same fact is true with regard to conventional diamine cross-linking agents. However, this does not preclude their use. Thus, the present foams can also have included therewith other catalysts as well as cross-linking agents and the like.

Suitable auxiliary catalysts include tertiary amines, such as diethylene triamine ketimine, tetramethylene diamine, triethylene diamine, tetramethylbutane diamine, tetramethyl guanidine, trimethyl piperazine and metallo-organic salt catalysts which are polyvalent metal salts of an organic acid having up to about eighteen carbon atoms and being void of active hydrogen atoms. The organo portion of the salt may be either linear or cyclic and saturated or unsaturated. Generally, the polyvalent metal has a valence from about two to four. Typical metallo-organic salts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, lead octoate, cobalt naphthenate, zinc naphthenate, bis(phenyl mercury) dodecyl succinate, phenyl mercuric benzoate, cadmium naphthenate, dibutyltin dilaurate, and dibutyltin-di-2-ethylhexoate. Generally, these catalysts, when used, will be employed in an amount ranging from about 0.01 part to 7.5 parts by weight, based on the weight of polyether polyol, and preferably, from about 0.05 part to 4.0 parts by weight thereof per 100 parts by weight of polyether polyol.

Suitable optional cross-linking agents include, for example, hindered, aromatic diamines like 4,4'-methylene-bis(2 - chloroaniline) and 3,3' - dichlorobenzidine; tertiary amines containing hydroxyl groups and capable of cross-linking such as triethanolamine, triisopropanolamine, N,N,N',N'-tetrakis(2 - hydroxypropyl)ethylenediamine as well as other condensation products of alkylene oxides and ethylenediamine or diethylenetriamine and low molecular weight polyols such as glycerol, and trimethylolpropane.

In addition to the previously defined ingredients useful in the preparation of the foam, other ingredients, such as surfactants, fillers, pigments and the like can also be included. Surfactants which can be used are the conventional surfactants used in urethane preparation such as the polysiloxanes or the alkylene oxide adducts of organic compounds containing reactive hydrogen atoms.

Generally, the surfactant is employed in an amount ranging from about 0.01 part to 5 parts by weight thereof per hundred parts of polyol. Conventional fillers for use herein include, for example, aluminum silicate, calcium silicate, magnesium silicate, calcium carbonate, barium sulfate, calcium sulfate, carbon black and silica. The filler is nominally present in an amount ranging from about 5 parts to 50 parts by weight thereof per hundred parts by weight of polyol, and preferably, from about 15 parts to 45 parts by weight thereof per one hundred parts by weight of polyol.

The pigment which can be used herein can be selected from any conventional pigment heretofore disclosed in the art, such as, titanium dioxide, zinc oxide, iron oxides, antimony oxide, chrome green, chrome yellow, iron blue siennas, molybdate oranges, organic pigments, such as para reds, benzidine yellow, toluidine red, toners, and phthalocyanines.

Also, conventional blowing agents, such as water, halohydrocarbons, hydrocarbons, and the like can be employed herein in their conventional mode.

into a cardboard cake box and the foam was allowed to rise therein. After foam rise was completed the resulting foam was oven cured for about fifteen minutes.

The following table, Table I, sets forth the ingredients and amounts thereof in parts by weight used to prepare the foams, as well as some of the reaction conditions.

TABLE I

| | I | II | III | IV | V | VI | VII | VIII | IX | X | XI | XII | XIII |
|---|---|---|---|---|---|---|---|---|---|---|---|---|---|
| Ingredients: | | | | | | | | | | | | | |
| Polyol [a] | 300 | 300 | 300 | 300 | 300 | 300 | 300 | 330 | 300 | 300 | 300 | 300 | 300 |
| Water | 9.0 | 9.0 | 9.0 | 9.0 | 9.0 | 9.0 | 9.0 | 9.0 | 9.0 | 0.9 | 9.0 | 9.0 | 9.0 |
| N-ethylmorpholine | 1.0 | 1.0 | 1.0 | 1.0 | 2.0 | 1.0 | 1.0 | 2.0 | 2.0 | | 1.0 | 4.0 | |
| Catalyst | [b]1.0 | [c]1.0 | [c]1.0 | [c]1.0 | [c]1.0 | [c]1.0 | [d]4.5 | [d]5.0 | [d]4.5 | [e]4.0 | [f]3.0 | ([g]) | [h]6.0 |
| Silicone surfactant [j] | 0.10 | 0.10 | 0.10 | 0.10 | 0.10 | 0.25 | 0.10 | 0.13 | 0.35 | 0.10 | 0.10 | 0.10 | 0.10 |
| NIAX—A-1 [k] | 0.20 | 0.20 | 0.10 | 0.10 | 0.10 | 0.10 | 0.20 | 0.10 | 0.10 | | 0.20 | 0.40 | |
| TDI [l] | 134 | 134 | 164 | 189 | 134 | 206 | 135 | 166 | 207 | 135 | 135 | 135 | 135 |
| TDI index | 130 | 130 | 160 | 184 | 130 | 200 | 130 | 160 | 200 | 130 | 130 | 130 | 130 |
| Foam properties: | | | | | | | | | | | | | |
| Rise time, sec | 59 | 128 | 101 | 83 | 105 | 133 | 109 | 115 | 115 | 140 | 58 | 110 | 142 |
| Foam height, mm | [m]15 | 137 | 147 | 157 | 140 | 181 | 145 | 156 | 162 | 135 | 149 | 88 | 147 |
| Foam weight | 364 | 379 | 403 | 432 | 371 | 452 | 386 | 415 | 460 | 380 | 351 | 416 | 395 |

[a] Glycerine based polyoxypropylene polyol capped with polyoxyethylene groups (OH Number of 35).
[b] A 30 percent solution of triethylene diamine in dipropylene glycol.
[c] 1,3,5-tris(N,N-dimethyl-3-aminopropyl)-s-hexahydrotriazine.
[d] A 33 percent solution of the propylene oxide-water adduct of 1,3,5-tris(N,N-dimethyl-3-aminopropyl)-s-hexahydrotriazine in dipropylene glycol.
[e] 2,4,6,tri(dimethylaminomethyl) phenol.
[f] Bis(tri-n-butyltin) oxide.
[g] 10 ml. of calcium naphthenate in 11.8 ml. of methanol.
[h] 1:1:1 mole adduct of triethylene diamine-water and propylene oxide.
[j] A polysiloxiane sold by Dow Corning under the name DC-200.
[k] Bis(2-N,N-dimethylamine ethyl) ether.
[l] An isomeric mixture of 80 percent 2:4- and 20 percent 2:6-toluene diisocyanate.
[m] Foam collapsed.

In preparing the flexible foams of the present invention any general procedure conventionally utilized for the preparation of a urethane foam can be practiced. Generally speaking, such procedure entails the mixing together of the ingredients, with agitation until the foaming reaction commences. After foam formation ceases the resulting product is then cured at a temperature ranging from about 25° C. to 150° C. for about five minutes to twenty-four hours.

For a more complete understanding of the present invention reference is made to the following non-limiting examples. In the examples all parts are by weight unless otherwise noted. The properties of the foams described in the examples were determined in accordance with the following tests:

Burning—ASTM D-1692-68
Physicals—ASTM D-1564-64T.

The determination of indentation load deflection is carried out employing a foam sample 3" x 3" x 1" and an indenter foot having a one square inch surface area.

EXAMPLES I–XIII

A series of high resiliency polyurethane foams were prepared by the following procedure:

Using a one quart capacity 3⅜" diameter cylindrical container equipped with a Lightnin Model V-7 mixer fitted with a 1¼" diameter shrouded mixing blade and operatively connected to a rheostat control set at 140 volts, a suitable quantity of active hydrogen-containing compound, water, cross-linking agent, conventional tertiary amine catalyst, surfactant, and isocyanate trimerization catalyst was added to the containers. The mixture was stirred for about thirty seconds, allowed to set for about fifteen seconds and then stirring was resumed. After about sixty seconds elapsed time the polyisocyanate was added to the container and the resulting mixture was stirred for about four to five seconds. The content of the container was then immediately poured

EXAMPLES XIV–XVI

To further evidence the utility of the present catalysts under high isocyanate indices, the procedure described in Example I was repeated using varying amounts of ingredients. Table II sets forth the ingredients and amount in parts by weight that were employed as well as the physical properties of the foams prepared. The polyol employed was the same polyol as emloyed in Example I.

TABLE II

| | Amount, parts | | |
|---|---|---|---|
| | XIV | XV | XVI |
| Ingredients: | | | |
| Polyol | 100 | 100 | 100 |
| Water | 3.0 | 3.0 | 3.0 |
| N-ethylmorpholine | 0.61 | 0.61 | 0.31 |
| 1,3,5-tris(3-dimethylaminopropyl)-s-hexahydrotriazine | 0.31 | 0.46 | 0.31 |
| Silicone surfactant | 0.03 | 0.04 | 0.08 |
| Bis(2-N,N-dimethylamine ethyl)ether | 0.06 | 0.03 | 0.03 |
| Toluene diisocyanate)80/20/2,4-, 2,6-isomer mixture) | 44.7 | 54.7 | 68.7 |
| TDI index | 130 | 160 | 200 |
| Properties: | | | |
| Rise time, sec | 108 | 103 | 113 |
| Density, lbs./ft.³ | 1.9 | 1.9 | 1.9 |
| Tensile strength, p.s.i. | 6.9 | 11.7 | 12.6 |
| Elongation, percent | 70 | 63 | 50 |
| Tear resistance, p.s.i. | 0.5 | 0.6 | 1.1 |
| Indentation load deflection, p.s.i.: | | | |
| 25% | 0.61 | 0.92 | 2.12 |
| 65% | 1.64 | 2.49 | 5.08 |
| Compression set: | | | |
| 50% deflection | 13.6 | 16.2 | 14.3 |
| 90% deflection | 88.4 | 73.5 | 16.5 |
| Sag factor | 2.7 | 2.7 | 2.7 |
| Air flow, c.f.m. | 2.3 | 1.0 | 4.0 |
| Flame test, type | Sx' | Sx' | Sx' |
| Burning time, sec | 13.0 | 17.7 | 41.7 |
| Inches consumed | 0.8 | 1.2 | 3.6 |

Note.—Sx' = extinguishing.

EXAMPLES XVII–XXV

Following the procedure described in Example I, a series of polyurethane foams were prepared employing a mixture of polyether polyols with various organic polyisocyanates at different isocyanate levels. Details of the preparations are presentel in Table III below. Amounts given are in parts by weight.

TABLE III

|  | XVII | XVIII | XIX | XX | XXI | XXII | XXIII | XXIV | XXV |
|---|---|---|---|---|---|---|---|---|---|
| Ingredients: | | | | | | | | | |
| Polyol [a] | 150 | 150 | 150 | 150 | 150 | 150 | 150 | 150 | 150 |
| Polyol [b] | 150 | 150 | 150 | 150 | 150 | 150 | 150 | 150 | 150 |
| Water | 9.0 | 9.0 | 9.0 | 9.0 | 9.0 | 9.0 | 9.0 | 9.0 | 9.0 |
| N-ethylmorpholine | 2.5 | 2.0 | 1.0 | 2.0 | 2.0 | 1.0 | 2.0 | 2.0 | 2.0 |
| Catalyst [c] | 2.0 | 2.0 | 1.5 | 1.5 | 2.0 | 1.5 | 1.5 | 2.0 | 1.5 |
| Silicone surfactant [d] | 0.2 | 0.125 | 0.25 | 0.625 | 0.625 | 0.75 | 0.7 | 0.6 | 0.7 |
| NIAX—AI [e] | 0.2 | 0.1 | 0.1 | 0.2 | 0.1 | 0.1 | 0.2 | 0.1 | 0.2 |
| TDI [f] | 121.2 | 149.2 | 186 | | | | | | |
| Polymethylene polyphenylisocyanate | 30.3 | 37.3 | 47 | | | | | | |
| 50/50 mixture of crude methylene di(phenylisocyanate) and TDI | | | | 173 | 212 | 266 | | | |
| Crude TDI | | | | | | | 161 | 198 | 248 |
| Isocyanate index | 130 | 160 | 200 | 130 | 160 | 200 | 130 | 160 | 200 |
| Foam properties: | | | | | | | | | |
| Rise time, sec | 100 | 109 | 130 | 110 | 116 | 141 | 103 | 105 | 113 |
| Foam height, m.m | 152 | 150 | 168 | 151 | 171 | 176 | 145 | 172 | 170 |
| Foam weight | 394 | 442 | 493 | 424 | 461 | 520 | 398 | 447 | 491 |

[a] Glycerine based polyoxypropylene polyol capped with polyoxyethylene groups (OH Number of 35).
[b] A liquid polyoxyethylene polyoxypropylene block copolymer prepared by condensing ethylene oxide with a 1,750 molecular polypropylene oxide base, the copolymer contining about 10 percent by weight of ethylene oxide.
[c] 1,3,5-tris(N,N-dimethyl-3-aminopropyl)-s-hexahydrotriazine.
[d] A polysiloxane sold by Dow Corning under the name DC-200.
[e] Bis(2-N,N-dimethylamine ethyl) ether.
[f] An isomeric mixture of 80 percent 2:4- and 20 percent 2:6-toluene diisocyanate.

EXAMPLES XXVI–XXXVI

Following the procedure described in Example I a series of polyurethane foams was prepared employing various organic polyisocyanates at different isocyanate levels and as the polyol component, a trimethylolpropane based polyoxypropylene polyol capped with polyoxyethylene groups (OH number of 25).

Details of the preparations are presented in Table IV below. Amounts given are in arts by weight.

Ingredients

| | Amount, parts |
|---|---|
| Polyol [1] | 300.0 |
| Water | 9.0 |
| 1,3,5 - tris(3 - dimethylaminopropyl)-s-hexahydrotriazine | 1.5 |
| Silicone surfactant | 0.115 |
| Isocyanate [2] | 158.3 |
| Isocyanate index | 130 |

TABLE IV

|  | XXVI | XXVII | XXVIII | XXIX | XXX | XXXI | XXXII | XXXIII | XXXIV | XXXV | XXXVI |
|---|---|---|---|---|---|---|---|---|---|---|---|
| Ingredients: | | | | | | | | | | | |
| Polyol [a] | 300 | 300 | 300 | 300 | 300 | 300 | 300 | 300 | 300 | 300 | 300 |
| Water | 9.0 | 9.0 | 9.0 | 9.0 | 9.0 | 9.0 | 9.0 | 9.0 | 9.0 | 9.0 | 9.0 |
| N-ethylmorpholine | 2.0 | 2.0 | | 2.0 | 1.5 | 2.0 | 2.0 | 1.0 | 2.0 | 2.0 | 2.0 |
| Catalyst [b] | 1.5 | 1.0 | 1.0 | 1.5 | 1.25 | 1.5 | 2.0 | 2.5 | 1.5 | 2.0 | 2.5 |
| Silicone surfactant [c] | 0.6 | 0.6 | 0.4 | 0.6 | 1.1 | 0.6 | 0.6 | 0.6 | 1.1 | 0.6 | 1.75 |
| NIAX—AI [d] | 0.2 | 0.1 | | 0.2 | 0.15 | 0.2 | 0.1 | 0.1 | 0.2 | 0.1 | 0.2 |
| TDI [e] | 128.5 | 158.5 | 197.7 | 110.8 | 136.4 | | | | | | |
| Polymethylene polyphenylisocyanate | | | | 27.7 | 34.1 | | | | | | |
| 50/50 mixture of crude methylene di(phenylisocyanate) and TDI | | | | | | 158 | 194.5 | 243 | | | |
| Crude TDI | | | | | | | | | 147 | 181 | 226 |
| Isocyanate index | 130 | 160 | 200 | 130 | 160 | 130 | 160 | 200 | 130 | 160 | 200 |
| Foam properties: | | | | | | | | | | | |
| Rise time, sec | 100 | 104 | 116 | 106 | 120 | 120 | 116 | 116 | 114 | 106 | 94 |
| Foam height, m.m | 149 | 25 | 20 | 147 | 138 | 153 | 174 | 176 | 152 | 168 | 176 |
| Foam weight | 359 | 381 | 444 | 366 | 408 | 393 | 445 | 471 | 381 | 412 | 449 |

[a] Trimethylolpropane based polyoxypropylene polyol capped with polyoxyethylene groups (OH number of 25).
[b] 1,3,5-tris(N,N-dimethyl-3-aminopropyl)-s-hexahydrotriazine.
[c] A polysilioxane sold by Dow Corning under the name DC-200.
[d] Bis(2-N,N-dimethylamine ethyl) ether.
[e] An isomeric mixture of 80 percent 2:4- and 20 percent 2:6-toluene diisocyanate.

The foamed compositions of Examples XVII–XIX were further tested for flame retardant and load bearing properties. The results of these tests are presented in Table V below.

TABLE V

| Properties | XVII | XVIII | XIX |
|---|---|---|---|
| Density, lbs./ft.$^3$ | 2.0 | 1.9 | 2.1 |
| Tensile strength, p.s.i. | 8.5 | 13.1 | 13.9 |
| Elongation, percent | 53 | 50 | 37 |
| Tear resistance, p.s.i. | 0.8 | 1.0 | 1.0 |
| Indentation load, deflection, p.s.i.: | | | |
| 25% | 0.91 | 1.88 | 3.3 |
| 65% | 2.27 | 4.50 | 8.0 |
| Compression set, deflection: | | | |
| 25% | 19.3 | 12.9 | 30.2 |
| 90% | 83.5 | 12.5 | 32.6 |
| Sag factor | 2.5 | 2.4 | 2.4 |
| Air flow, c.f.m | 1.4 | 2.2 | 2.4 |
| Flame test, type | Sx' | Sx' | Sx' |
| Burning time, sec | 9.3 | 13.7 | 31.0 |
| Inches consumed | 1.0 | 1.2 | 2.4 |

Note.—Sx'=self extinguishing.

EXAMPLE XXXVII

Following the procedure of Example I a cellular polyurethane product was prepared from the following.

Properties

| | Amount, parts |
|---|---|
| Rise time | seconds 134 |
| Foam height | mm 141 |
| Foam weight | parts 400 |

[1] A liquid polyoxyethylene polyoxyproplene block copolymer prepared by condensing ethylene oxide with a 1750 molecular polypropylene oxide base, the copolymer containing about 10 percent by weight of ethylene oxide.
[2] An 80 : 20 weight mixture of toluene diisocyanate and polymethylene polyphenyl polyisocyanate.

The foam was cured in an oven for six minutes at 250° F. and the resulting product was good in appearance. This example was then repeated using 2.0 parts of the triazine catalyst with the same result.

EXAMPLE XXXVIII

This example illustrates the preparation of a cellular polyurethane in accordance with the present invention using only an isocyanate trimerization catalyst. Following the procedure of Example I and at room temperature, a polyurethane foam product was prepared from the following ingredients employing an isocyanate index of 160.

| Ingredients: | Amount, parts |
|---|---|
| Polyol (as in Example I) | 300 |
| 1,3,5 - tris(3 - dimethylaminopropyl)-s-hexahydrotriazine | 1.5 |
| Silicone surfactant | 0.125 |
| Toluene diisocyanate | 165 |

The following physical effects were observed:

| | | |
|---|---|---|
| Rise time | seconds | 121 |
| Foam height | mm | 141 |
| Foam weight | parts | 416 |

This example was then rerun using 207 parts of toluene diisocyanate (200 index) and 0.4 part of silicone surfactant. A rise time of 128 seconds, a foam height of 175 mm. and a foam weight of 459 parts resulted.

This example was again repeated using 207 parts of toluene diisocyanate (200 index), 0.30 part of silicone surfactant and 9.0 parts of water being mixed with the polyol as a blowing agent. A rise time of 124 seconds, a foam height of 170 mm. and a foam weight of 456 parts resulted.

EXAMPLE XXXIX

Following the procedure of Example I, a polyurethane foam was prepared from the following ingredients employing an isocyanate index of 163.

| Ingredients: | Amount, parts |
|---|---|
| Polyol (as in Example I) | 300 |
| Silicone surfactant | 0.2 |
| Water | 9.0 |
| 33 percent solution of the propylene oxide-water adduct of 1,3,5 - tris(N,N - dimethyl - 3-aminopropyl) - s - hexahydrotriazine in dipropylene glycol | 6.5 |
| Crude toluene diisocyanate | 194 |

A rise time of 154 seconds, a foam height of 155 mm. and a foam weight of 438 parts resulted. The example was rerun employing 242 parts of crude toluene diisocyanate (203 isocyanate index) and 7.5 parts of catalyst. A rise time of 149 seconds, a foam height of 165 mm. and a foam weight of 481 were noted.

Having thus described the invention, what it is desired to claim and secure by Letters Patent is:

1. A flexible polyurethane foam composition prepared in the presence of water by the reaction of
   (a) a polyalkylene polyether polyol with
   (b) an organic polyisocyanate employing an isocyanate index of from 115 to 200 in the presence of a catalytically sufficient amount of a 1,3,5 - tris(N,N-dialkylaminoalkyl)-s-hexahydrotriazine or the alkylene oxide and water adducts thereof.

2. The composition of claim 1 wherein the organic polyisocyanate is toluene diisocyanate, polymethylene polyphenyl polyisocyanate, methylene di(phenylisocyanate) or mixtures thereof.

3. The composition of claim 1 wherein the catalyst is 1,3,5-tris(3-dimethylaminopropyl)-s-hexahydrotriazine.

4. The composition of claim 1 prepared in the presence of an auxiliary urethane catalyst.

5. The composition of claim 1 prepared in the presence of a silicone surfactant.

6. A process for the preparation of a flexible polyurethane foam composition which comprises reacting in the presence of water, a polyalkylene polyether polyol with an organic polyisocyanate having an isocyanate index of from 115 to 200 in the presence of a catalytically sufficient amount of a 1,3,5-tris(N,N-dialkylaminoalkyl)-s-hexahydrotriazine or the alkylene oxide and water adducts thereof.

7. The process of claim 6 wherein the organic polyisocyanate is toluene diisocyanate, polymethylene polyphenyl polyisocyanate, methylene di(phenylisocyanate) or mixtures thereof.

8. The process of claim 6 wherein the catalyst is 1,3,5-tris(3-dimethylaminopropyl)-s-hexahydrotriazine.

9. The process of claim 6 prepared in the presence of an auxiliary urethane catalyst.

References Cited

UNITED STATES PATENTS

| | | | |
|---|---|---|---|
| 3,072,582 | 1/1963 | Frost | 260—2.5 |
| 2,993,870 | 7/1961 | Burkus | 260—2.5 AW |
| 3,644,168 | 2/1972 | Bonk et al. | 260—2.5 AW |
| 2,950,263 | 8/1960 | Abbotson et al. | 260—2.5 AC |
| 3,644,232 | 2/1972 | Bernard et al. | 260—2.5 AW |

FOREIGN PATENTS

| | | | |
|---|---|---|---|
| 852,138 | 10/1960 | Great Britain | 260—2.5 AC |

DONALD E. CZAJA, Primary Examiner

G. R. MARSHALL, Assistant Examiner

U.S. Cl. X.R.

260—2.5 AC, 2.5 AP